United States Patent [19]
Ogawa et al.

[11] Patent Number: 4,851,289
[45] Date of Patent: Jul. 25, 1989

[54] MAGNETIC RECORDING MEDIUM

[75] Inventors: Hiroshi Ogawa; Shinji Saito; Toshihiko Miura; Nobuo Yamazaki; Hiroaki Araki, all of Kanagawa, Japan

[73] Assignee: Fuji Photo Film Co., Ltd., Kanagawa, Japan

[21] Appl. No.: 150,860

[22] Filed: Feb. 1, 1988

[30] Foreign Application Priority Data

Jan. 30, 1987 [JP] Japan .................................. 62-18634
Jan. 30, 1987 [JP] Japan .................................. 62-18635
Apr. 1, 1987 [JP] Japan .................................. 62-77610

[51] Int. Cl.$^4$ .............................................. G11B 5/70
[52] U.S. Cl. .................................... 428/329; 428/694; 428/900
[58] Field of Search ................ 428/695, 694, 329, 900

[56] References Cited

U.S. PATENT DOCUMENTS

| 4,439,795 | 3/1984 | Kitamoto | 428/900 |
| 4,513,054 | 4/1985 | Kitamoto | 428/329 |
| 4,624,883 | 11/1986 | Yamaguchi | 428/212 |
| 4,689,263 | 8/1987 | Kambe | 428/329 |
| 4,741,953 | 5/1988 | Katsuta | 428/329 |

Primary Examiner—Paul J. Thibodeau
Attorney, Agent, or Firm—Sughrue, Mion, Zinn, Macpeak & Seas

[57] ABSTRACT

A magnetic recording medium comprising a non-magnetic support having provided thereon plural magnetic layers containing ferromagnetic particles and binders, wherein the ferromagnetic particles contained in the uppermost magnetic layer have an average long axis length measured by a transmission electron microscope of 0.25 $\mu$m or less and a crystal size measured by an X-ray deffractiometory of 300 Å or less, and the ferromagnetic particles contained in the magnetic layers other than the uppermost layer have an average long axis length measured by a transmission electron microscope of 0.25 $\mu$m or less and a crystal size measured by an X-ray deffractiometory of 250 Å more, provided that the ferromagnetic particles of the uppermost layer have a crystal size measured by an X-ray deffractiometory smaller than the crystal size measured by an X-ray deffractiometory of the ferromagnetic particles of the magnetic layers other than the uppermost layer.

14 Claims, No Drawings

MAGNETIC RECORDING MEDIUM

FIELD OF THE INVENTION

The present invention relates to a magnetic recording medium having plural magnetic layers, and more particularly it relates to a magnetic recording medium having improved electromagnetic properties, head wear-out resistance and durability.

BACKGROUND OF THE INVENTION

Magnetic recording media comprising a non-magnetic support having provided thereon a magnetic layer containing ferromagnetic iron oxide particles or ferromagnetic alloy particles dispersed in binders are widely used as media of video tapes, audio tapes and the like.

In recent years, together with the strong demand for higher density recording in a magnetic recording medium, demands for higher vision image qualities, and higher sound qualities have increased. Therefore, it has been necessary that electromagnetic properties be improved, that is, particularly that C/N (carrier/noise ratio) be increased and that BN (bias noise) be decreased.

For the above purposes, the size of ferromagnetic particles must be reduced and the number of magnetic particles per unit volume must be increased. However, if the specific surface area of ferromagnetic particles is increased to increase the number of magnetic particles per unit volume, voids are formed on the surface of the ferromagnetic particles and the particle size is not actually so small as desired or the axis ratio (ratio of a short axis to long axis) becomes lower, whereby the above objects can not be fulfilled. In other words, there are some problems, in that if voids are formed, loss of magnetic susceptibility increases, and in that if the axis ratio of ferromagnetic particles becomes lower, magnetic orientation of magnetic particles is not carried out effectively upon preparing a magnetic recording medium.

Furthermore, as the size of ferromagnetic particles is reduced, print-through characteristics tend to deteriorated due to the increase of low coercive force components in the ferromagnetic particles, such that the resulting medium, ultimately, can not be used practically.

Also, if the size of the ferromagnetic particles is reduced, the light-transmission degree of a magnetic layer increases. In a video tape deck (VHS type, 8 mm type, and the like), the end of a tape is detected by a photosensor capable of detecting light having a wavelength of about 900 nm. Therefore, the light-transmission degree of a tape must be 10% or less to avoid mis-operations of the photosensor. Accordingly, when the size of ferromagnetic particles is reduced, it becomes necessary to add light-intercepting particles into a magnetic layer in a large amount, or to provide a thick backing layer or a light-intercepting layer.

However, when light-intercepting particles are added into a magnetic layer in a large amount, electromagnetic properties are deteriorated. When a backing coat layer or another light-intercepting layer is provided to intercept light, surface properties and electromagnetic properties are deteriorated by the orange peel of the backing layer caused by making the layer thick.

When the size of ferromagnetic particles is increased to improve print through characteristics, and the like, there is a problem in that head wear increases.

SUMMARY OF THE INVENTION

An object of the present invention is to provide a magnetic recording medium having improved electromagnetic properties, head wear, and durability.

Another object of the present invention is to provide a magnetic recording medium using reduced particle size of ferromagnetic particles without deteriorating print-through characteristics and light-intercepting property.

Still another objects will be apparent from the following description.

As a result of extensive investigations to solve the above described problems, the present inventors have found that the objects of the present invention are attained by a magnetic recording medium comprising a nonmagnetic support having provided thereon plural magnetic layers containing ferromagnetic particles and binder, wherein the ferromagnetic particles contained in the uppermost magnetic layer have an average long axis length measured by transmission electron microscopy of less than 0.25 μm and a crystal size measured by an X-ray diffractiometory of less than 300 Å, and the ferromagnetic particles contained in the magnetic layers other than the uppermost layer have an average long axis length measured by transmission electron microscopy of 0.25 μm or more and a crystal size measured by X-ray diffractiometory of 250 Å or more, provided that the ferromagnetic particles of the uppermost layer have a crystal size measured by X-ray diffractiometory smaller than that of the ferromagnetic particles of the magnetic layers other than the uppermost layer.

DETAILED DESCRIPTION OF THE INVENTION

In the magnetic recording medium of the present invention, it is preferred that plural magnetic layers be provided by a multiple coating method of a so-called wet-on-wet method (which may be either a sequential multiple coating method or a simultaneous multiple coating method) so that an uppermost layer has a dry thickness of 2.0 μm or less, using a non-hardenable (thermoplastic) binder(s) for an underlayer and preferably using a hardenable binder(s) as the binder for the uppermost layer.

It is preferred in the present invention that the ferromagnetic particles of the uppermost layer have a crystal size measured by X-ray diffractiometry of less than 250 Å and that the ferromagnetic particles contained in the magnetic layers other than the uppermost magnetic layer have a crystal size of 250 Å or higher measured by X-ray diffractiometry.

Examples of the ferromagnetic particles used in the magnetic recording medium of the present invention include ferromagnetic iron oxide $FeO_x$ ($1.33 \leq x \leq 1.5$) particles (hereinafter referred to as "ferromagnetic iron oxide particles"), cobalt-containing ferromagnetic iron oxide $Co\text{-}FeO_x$ ($1.33 \leq x \leq 1.5$) particles (hereinafter referred to as "cobalt-containing ferromagnetic alloy particles").

When ferromagnetic iron oxide particles or cobalt-containing ferromagnetic iron oxide particles are used as the ferromagnetic particles, it is preferred that the ferromagnetic particles contained in the uppermost layer have a crystal size measured by X-ray diffractiometry of less than 300 Å and that the ferromagnetic particles contained in the magnetic layers other than the uppermost magnetic layer have a crystal size measured by X-ray diffractiometry of 300 Å or more.

When ferromagnetic alloy particles are used as the ferromagnetic particles contained in the uppermost layer of the magnetic recording medium of the present invention, it is preferred that the ferromagnetic particles contained in the uppermost magnetic layer have a crystal size measured by X-ray diffractiometry of less than 200 Å, and that the ferromagnetic particles contained in the magnetic layers other than the uppermost layer have a crystal size measured by X-ray diffractiometry of 250 Å or more. In this case, magnetic particles contained in the magnetic layers other than the uppermost magnetic layer are not particularly limited, but preferably are ferromagnetic iron oxide particles of $\gamma$-$Fe_2O_3$, $Fe_3O_4$, and the intermediate iron oxide represented by $FeO_x$ ($1.33 < X \leq 1.5$), cobalt-containing ferromagnetic iron oxide formed by adding cobalt to these iron oxide (cobalt modified), and ferromagnetic metal particles. Among those, Co-$FeO_x$ ($1.33 < X \leq 1.5$) particles are preferred in view of cost and easy preparation of a coating solution.

In the present invention, "crystal size" is measured by X-ray diffractiometry, which is disclosed in detail in *X-sen Kesshougaku* (X-ray Crystallography), page 489, by Isamu Nita, published by Maruzen Shuppan Co., Ltd. on Jan. 5, 1961. The term "average long axis length" is measured by a transmission electron microscopy (as disclosed in detail in Ryudo Sokutei Gijutsu (Grain Size Measurement Technology), page 39, published by Nikkan Kogyo Press on Aug. 20, 1975.

In the present invention, examples of the ferromagnetic particles contained in the uppermost layer include $\gamma$-$Fe_2O_3$, $Fe_3O_4$, an intermediate ferromagnetic iron oxide thereof represented by $FeO_x$ ($1.33 \leq X \leq 1.5$), cobalt-containing ferromagnetic iron oxide particles represented by Co-$FeO_x$ ($1.33 \leq X \leq 1.5$), or alloy particles mainly composed of iron, which have an average long axis length of less than 0.25 $\mu$m measured by a transmission electron microscopy, and have a crystal size measured by X-ray diffractiometry of less than 300 Å.

It is not preferred that the ferromagnetic particles contained in the uppermost layer have an average long axis length of 0.25 $\mu$m or more or a crystal size of 300 Å or more, because the modulation noise and bias noise of the magnetic recording medium are increased.

The ferromagnetic iron oxide particles and the cobalt-containing ferromagnetic iron oxide particles used in the uppermost magnetic layer preferably have a coercive force of from 350 to 5,000 Oe, more preferably from 600 to 2,500 Oe, and most preferably from 800 to 2,000 Oe.

The ferromagnetic alloy particles used in the uppermost layer can be prepared by the following methods.

(1) A method of reducing iron oxide which comprises reducing acicular iron oxyhydroxide, acicular oxyhydroxide containing other metals, or acicular iron oxide obtained from those oxyhydroxides (as described e.g., in U.S. Pat. Nos. 3,186,829 and 3,190,748).

(2) A low-pressure vacuum evaporation method which comprises vapor depositing ferromagnetic metals in an inactive gas at low pressure (as described e.g., in U.S. Pat. Nos. 3,598,568, 3,607,220, and 3,702,270).

(3) A method of reducing metal salts capable of forming ferromagnetic composition in an aqueous solution of the metal salts by reducing substances such as boron hydride compounds, hypophosphite or hydrazine to obtain ferromagnetic particles (as described e.g., in Japanese Patent Application (OPI) Nos. 25620/71, 4131/72, and 27718/72) (the term "OPI" used herein means a published unexamined Japanese Patent Application).

(4) A method which comprises heat-decomposing organic acid salts of ferromagnetic metals and reducing them with reducing gases (as described e.g., in U.S. Pat. Nos. 2,983,997, 3,172,776, and 3,200,007).

(5) A method of heat-decomposing metal carbonyl compounds (as described e.g., in U.S. Pat. Nos. 3,198,717, 3,156,650, and 3,262,812).

(6) A method which comprises electrodepositing ferromagnetic metal particles using a mercury cathode and separating the particles from the mercury (as described e.g., in U.S. Pat. Nos. 3,607,218, 3,756,866, and 3,206,338).

In the present invention, ferromagnetic metal particles prepared in accordance with the methods (1), (2) and (3) are preferably used and, particularly, particles prepared in accordance with the method (1) are the most preferred in view of cost and quality thereof. Upon preparing ferromagnetic metal particles of the present invention, it is preferred to provide an oxide film on the surface of the metal particles to improve chemical stability of the metal particles.

The composition of ferromagnetic alloy particles is pure iron or an alloy such as Fe, Fe-Ni, or Fe-Ni-Co, and may contain non-magnetic or non-metallic elements such as B, C, N, Al, Si, P, S, Ti, Cr, Mn, Cu or Zn in a small amount to improve the characteristics thereof. It is preferred that the ferromagnetic particles have a specific surface area of 30 m$^2$/g or more, and preferably 40 m$^2$/g or more in order to carry out the present invention effectively.

Upon preparing the ferromagnetic alloy particles used in the present invention, manufacturing conditions are determined according to the description of the references in which the manufacturing methods are described so that a predetermined average long axis length and a predetermined crystal size along with a (110) plane can be obtained.

The coercive force of the ferromagnetic alloy particles is preferably from 600 to 5,000 Oe. A coercive force of about 590 Oe or less is not preferred, because the crystal size increases. When the coercive force is about 5,010 Oe or more is also not preferred, because recording can not be done with a normal magnetic head.

The uppermost layer of the present invention preferably has a thickness of 2 $\mu$m or less and more preferably 1 $\mu$m or less. The thickness of about 2.1 $\mu$m or more of the uppermost layer is not preferred, since the benefical multilayer effect is reduced.

Ferromagnetic particles contained in the magnetic layers other than the uppermost layer of the present invention (hereinafter referred to as "underlayers") are preferably ferromagnetic iron oxide particles or cobalt-containing ferromagnetic iron oxide particles having an average long axis length of 0.25 $\mu$m or more and a crystal size of 250 Å or more, preferably 300 Å or more, and more preferably 350 Å or more.

When ferromagnetic particles contained in the underlayers have an average long axis length of less than 250 Å or a crystal size of less than 250 Å, the filling density of the ferromagnetic particles decreases, and print-through characteristics and magnetic flux densities decrease, thereby deteriorating electromagnetic properties of the magetic recording medium.

When ferromagnetic iron oxide particles or cobalt-containing ferromagnetic iron oxide particles are used in the uppermost layer, the underlayers preferably have a coercive force of from 0.6 to 1.1 times, and more preferably from 0.8 to 1.0 times, that of the ferromagnetic particles of the uppermost layer.

When ferromagnetic alloy particles are used in the uppermost layer, the underlayers preferably have a coercive force of from 0.4 to 1.1 times higher, and more preferably from 0.6 to 1.0 times, that of the ferromagnetic poarticles of the uppermost layer. When the coercive force of the underlayers is about 1.2 times that of the uppermost layer, electromagnetic properties at a long wavelength range deteriorate, and when it is about 0.3 times that of the uppermost layer, electromagnetic properties at a short wavelength range deteriorate.

The underlayers preferably have a thickness of 0.5 $\mu$m or more. When the thickness thereof is less than about 0.5 $\mu$m, the uppermost layer is readily affected by the surface roughness of the support, thereby deteriorating the electromagnetic properties.

The binders used in the uppermost layer may be thermoplastic binders, but preferably are hardenable type binders hardened with isocyanate and the like, particularly when intended for use with a rotating head made to run at a high speed on a video tape or a digital audio tape. Examples of the hardenable binder include a composition comprising a vinyl chloride/vinyl acetate copolymer, and a polyisocyanate.

Binders used for underlayers may be the abovedescribed hardenable binders, but preferably are nonhardenable thermoplastic binders.

Examples of the thermoplastic binders include vinyl chloride-vinyl acetate resins, vinyl chloride-vinyl acetate resins containing functional groups, acrylate type copolymers, methacrylate type copolymers, saturated polyester resins, polyurethane resins, polyurethane resins having functional groups, cellulose type resins and the like. Particularly, vinyl chloride-vinyl acetate resins having functional groups, polyurethane resins, and polyurethane resins having functional groups are preferred. Preferred examples of the functional groups include SO$_3$M group, —COOM group, —OM group, —OSO$_3$M group and

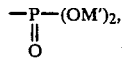

wherein M represents a hydrogen atom or an alkali metal atom, M' represents a hydrogen atom, an alkali metal atom, or a hydrocarbon group.

Preferred examples of the polyurethane resins include a polyester polyurethane, a polycaprolactone polyurethane, a polycarbonate polyurethane and the like.

In the case where thermoplastic resins are used in the underlayers, it is preferred that the coating solutions for the underlayers and the uppermost layer are multicoated under wet conditions. That is, the solutions are coated by a wet-on-wet coating method which includes a sequential multicoating method, and a simultaneous multicoating method.

The coating method as disclosed in Japanese Patent Application (OPI) No. 139928/86 can be applied in the present invention as a wet-on-wet coating method.

It is difficult to obtain an uppermost layer having a thickness of 1 $\mu$m or less unless the layer is provided by a wet-on-wet method.

When the magnetic recording medium of the present invention is used as a video tape or a digital audio tape, the medium preferably has a light-transmission degree of 10% or less at a 900 nm wavelength, because a deck detects the tape end by light. For this purpose, light-intercepting particles such as carbon may be incorporated in the uppermost layer or the underlayers.

If necessary, additives generally used in the magnetic recording media such as lubricating agents, abrasive agents, dispersing agents, antistatic agents, and rust-preventing agents may be added to the magnetic layers of the present invention.

The magnetic layers of the present invention are prepared by dispersing, mixing, and kneading the abovedescribed ferromagnetic particles, binders, and additives, if necessary, with organic solvents to prepare coating solutions for underlayer and uppermost layer and then coating them on a non-magnetic support. The amount of the binder is generally from 10 to 300 parts by weight, preferably from 15 to 100 parts by weight, and more preferably from 20 to 50 parts by weight per 100 parts by weight of the ferromagnetic particles.

Examples of the organic solvents used upon mixing, kneading, and coating the coating solutions include ketones such as acetone, methyl ethyl ketone, methyl isobutyl ketone or cyclohexanone; esters such as methyl acetate, ethyl acetate, butyl acetate, ethyl lactate or monoethyl ether of glycol acetate; ethers such as ethyl ether, glycol dimethyl ether, glycol monoethyl ether, dioxane or tetrahydrofuran; aromatic hydrocarbons such as benzene, toluene or xylene; and chlorinated hydrocarbons such as methylene chloride, ethylene chloride, carbon tetrachloride, chloroform, ethylene chlorohydrin or dichlorobenzene.

Examples of the materials for the support used in the present invention include polyesters such as polyethylene terephthalate or polyethylene 2,6-naphthalate; polyolefins such as polyethylene or polypropylene; cellulose derivatives such as cellulose triacetate; and plastics such as polycarbonate, polyimide or polyamide imide.

A backing layer may be provided on the surface of the support opposite to the magnetic layers.

An under coated layer may be provided on a nonmagnetic support to improve adhesiveness between a nonmagnetic support and the magnetic layers.

The present invention is illustrated in more detail referring to the following Examples, but is not limited thereto.

EXAMPLE 1

The coating solutions A to C and a to c having the following compositions were prepared in a conventional manner.

| Coating solution A | |
|---|---|
| Co—$\gamma$-FeO$_x$ (x = 1.45, Hc 650 Oe, average long axis length 0.40 $\mu$m, crystal size 400 Å) | 100 parts |
| Copolymer of vinyl chloride and vinyl acetate (content of sulfonic acid group 0.25%, degree of polymerization 400) | 15 parts |
| Polyester Polyurethane (content of sulfonic acid group 0.1%) | 5 parts |
| Polyisocyanate (Collonate L-75, trade | 6.7 parts |

-continued

| | |
|---|---|
| name of polyisocyanate produced by Nippon Polyurethane Industries Co., Ltd.) | |
| Myristic acid (for industrial use) | 2 parts |
| Butyl stearate (for industrial use) | 1 part |
| Electroconductive carbon (20 mµ) | 3 parts |
| Methyl ethyl ketone/cyclohexanone (7/3) | 250 parts |
| Coating solution B | |
| Co—γ-FeO$_x$ (x = 1.44, Hc 700 Oe, average long axis length 0.35 µm, crystal size 380 Å) | 100 parts |
| Copolymer of vinyl chloride-vinyl acetate (content of vinyl alcohol 6% degree of polymerization 400) | 20 parts |
| Polycarbonate polyurethane | 5 parts |
| Myristic acid (for industrial use) | 2 parts |
| Butyl stearate | 1 part |
| Electroconductive carbon (20 mµ) | 3 parts |
| Methyl ethyl ketone/cyclohexanone (7/3) | 250 parts |
| Coating solution a | |
| Co—γ-FeO$_x$ (x = 1.46, Hc 850 Oe, average long axis length 0.18 µm, crystal size 240 Å) | 100 parts |
| Copolymer of vinyl chloride-vinyl acetate (sulfonic acid group content 0.25%, degree of polymerization 400) | 15 parts |
| Polyester polyurethane (content of sulfonic acid group 0.1%) | 5 parts |
| Polyisocyanate (Collonate L-75) | 6.7 parts |
| Myristic acid (for industrial use) | 2 parts |
| Butyl sterate (for industrial use) | 2 parts |
| α-alumina (particle size 0.2 µm) | 3 parts |
| Electroconductive carbon (20 mµ) | 1 part |
| Methyl ethyl ketone/cyclohexanone (7/3) | 250 parts |
| Coating solution b | |
| Co—γ-FeO$_x$ (Hc 1,200 Oe, average long axis length 0.21 µm, crystal size 200 Å) | 100 parts |
| Copolymer of vinyl chloride/vinyl acetate (content of sulfonic acid group 0.25%, degree of polymerization 400) | 15 parts |
| Polyester polyurethane (content of suitable acid group 0.1%) | 5 parts |
| Polyisocyanate (Collonate L-75) | 6.7 parts |
| Myristic acid (for industrial use) | 2 parts |
| Butyl stearate (for industrial use) | 1 part |
| α-alumina (particle size 0.2 µm) | 5 parts |
| Methyl ethyl ketone/cyclohexanone (7/3) | 250 parts |

Coating solution C

The same coating solution as that of A, except that Co-γ-FeO$_x$ (x=1.45, Hc 650 Oe, long axis length 0.23 µm, crystal size 240 Å) was used instead of Co-γ-FeO$_x$ of the solution A, was prepared.

Coating solution c

The coating solution same as that of the coating solution a was prepared, except that Co-γ-FeO$_x$ (x=1.46, Hc 850 Oe, long axis length 0.31 µm, crystal size 330 Å) was used instead of Co-γ-FeO$_x$ of the coating solution a, was prepared.

Single and multi-layered magnetic recording media as shown in Table 1 were prepared using the above solutions. Multiple layers were provided by a conventional wet-on-wet multicoating method. A polyethylene terephthalate film having a 14 µm thickness was used as a support.

Video sensitivity (VS), ratio of carrier/noise (C/N), print-through characteristics (S/P), head wear-out, and still life were measured regarding the above magnetic recording media in the following manner. The results thus obtained are shown in Table 1.

VS (dB)

The video sensitivity at 8 MHz was measured by using an amorphous magnetic head and is shown in terms of relative values when C-4 tape is assumed to have a value of 0 dB.

C/N (dB)

The carrier/noise ratio wherein the noise level was measured at a point 0.1 MHz apart from 8 MHz with respect to the sensitivity at 8 MHz was measured, and is shown in terms of relative values when C-4 tape is assumed to have a value of 0 dB.

S/P (dB)

A signal of 1 KHz was recorded to the medium and then the medium was allowed to stand at 40° C. for 48 hours. The ratio of the initial output of the signal and the output of print-through signal was measured.

Head wear (µm)

Head wear was evaluated after the medium (tape) ran for 100 hours.

Still life

Still life was evaluated in terms of a period of time for S/N of the images at a still mode to decrease by 6 dB.

TABLE 1

| No. | Coating solution for upper layer | Coating solution for lower layer | Thickness of upper layer (µm) | Thickness of lower layer (µm) | VS (dB) | C/N (dB) | S/P (dB) | Head wear (µm) | Still life (min.) |
|---|---|---|---|---|---|---|---|---|---|
| 1 | a | A | 0.5 | 3.5 | 2.9 | 3.1 | 53 | 3 | 120 |
| 2 | a | A | 1.0 | 3.0 | 2.6 | 2.8 | 53 | 3 | 120 |
| 3 | a | A | 1.5 | 2.5 | 2.3 | 2.6 | 52 | 3 | 120 |
| 4 | a | A | 2.0 | 2.0 | 1.9 | 2.3 | 50 | 4 | 120 |
| 5 | a | A | 1.0 | 3.0 | 3.1 | 3.5 | 50 | 3 | 120 |
| 6 | b | A | 1.0 | 3.0 | 3.9 | 4.4 | 50 | 1 | 120 |
| 7 | b | B | 1.0 | 3.0 | 4.2 | 4.6 | 50 | 1 | 120 |
| C-2 | a | — | 4.0 | — | 1.2 | 1.7 | 47 | 5 | 100 |
| C-3 | b | — | 4.0 | — | 2.3 | 2.6 | 40 | 2 | 120 |
| C-4 | — | A | — | 4.0 | 0.0 | 0.0 | 53 | 12 | 10 |
| C-5 | — | B | — | 4.0 | 0.5 | 0.2 | 50 | 10 | 2 |
| C-6 | c | A | 1.0 | 3.0 | −0.6 | −0.8 | 54 | 15 | 120 |
| C-7 | a | C | 1.0 | 3.0 | 1.8 | 2.0 | 46 | 5 | 100 |

It is clear from the results of Sample Nos. 1 to 4 in Table 1 that VS and C/N are excellent when the upper layer has a thickness of 2.0 μm or less, and particularly 1.0 μm or less.

It is clear from the results of Nos. 5 to 7 that the benefical effects of the present invention do not change when the compositions of the underlayer and the upper layer are changed.

It is understood from the results of Nos. C-6 and C-7 that the objects of the present invention can not be attained when only the uppermost layer or the underlayer is provided.

It is understood from the results of Nos. C-6 and C-7 that the objects of the present invention can not be fulfilled when the particle lengths and the crystal sizes of the ferromagnetic particles used in the underlayer and the upper layer are outside of the ranges of the present invention.

EXAMPLE 2

The coating solutions D to F and d to f having the following compositions were prepared in a conventional kneading, mixing, and dispersing method.

| Coating solution D | |
|---|---|
| Co—γ-FeO$_x$ (x = 1.45, Hc 650 Oe, average long axis length 0.35 μm, crystal size 350 Å) | 100 parts |
| Copolymer of vinyl chloride-vinyl acetate (content of sulfonic acid group 0.25%, degree of polymerization 400) | 15 parts |
| Polyester polyurethane (content of sulfonic acid group 0.1%) | 5 parts |
| Polyisocyanate (Collonate L-75) | 6.7 parts |
| Myristic acid (for industrial use) | 2 parts |
| Butyl stearate (for industrial use) | 1 part |
| Electroconductive carbon (20 mμ) | 3 parts |
| Methyl ethyl ketone/cyclohexanone (7/3) | 250 parts |
| Coating solution E | |
| Co—γ-FeO$_x$ (x = 1.45, coercive force 1,200 Oe, average long axis length 0.32 μm, crystal size 300 Å) | 100 parts |
| Copolymer of vinyl chloride-vinyl acetate (content of VOH 6%, degree of polymerization 400) | 20 parts |
| Polycarbonate polyurethane | 5 parts |
| Myristic acid (for industrisl use) | 2 parts |
| Butyl stearate (for industrial use) | 1 part |
| Electroconductive carbon (20 mμ) | 3 parts |
| Methyl ethyl ketone/cyclohexanone (7/3) | 250 parts |
| Coating solution d | |
| Fe—Zn—Ni alloy (coercive force 1,500 Oe, average long axis length 0.22 μm, crystal size 180 Å | 100 parts |
| Copolymer of vinyl chloride/vinyl acetate (content of sulfonic acid group 0.25%) | 15 parts |
| Polyester polyurethane (content of sulfonic acid group 0.1%) | 5 parts |
| Polyisocyanate (Collonate L-75) | 6.7 parts |
| Myristic acid (for industrial use) | 2 parts |
| Butyl stearate (for industrial use) | 1 part |
| α-alumina (particle size 0.2 μm) | 3 parts |
| Electroconductive carbon (20 mμ) | 1 part |
| Methyl ethyl ketone/cyclohezanone (7/3) | 250 parts |

Coating solution e

The same coating solution as that of d was prepared, except that 100 parts of Fe-Ni alloy (coercive force 2,000 Oe, average long axis length 0.18 μm, crystal size 150 Å) were used.

Coating solution F

The same coating solution as that of D was prepared, except that Co-γ-FeO$_x$ (x = 1.45, coercive force 650 Oe, average long axis length 0.20 μm, crystal size 200 Å was used instead of Co-γ-FeO$_x$ in the coating solution D.

Coating solution f

The same coating solution as that of d was prepared, except that Fe-Zn-Ni alloy (coercive force 1,500 Oe, average long axis length 0.28 μm, crystal size 230 Å) particles were used instead of the Fe-Zn-Ni alloy of the coating solution d.

Single and multi-layered magnetic recording media as shown in Table 2 were prepared using the above coating solutions. Multiple layers were provided by a conventional wet-on-wet multicoating method.

Regarding the above media, video sensitivities (VS), carrier/noise ratios (C/N), and still life were evaluated in the same manner as in Example 1. The standard tape of VS and C/N was C-10. The results obtained are shown in Table 2.

TABLE 2

| No. | Coating solution for upper layer | Coating solution for lower layer | Thickness of upper layer (μm) | Thickness of lower layer (μm) | VS (dB) | C/N (dB) | Still life (min.) | Head wear (μm) |
|---|---|---|---|---|---|---|---|---|
| 8 | d | D | 0.5 | 3.5 | 8.0 | 8.2 | 100 | 2 |
| 9 | d | D | 1.0 | 3.0 | 7.9 | 8.1 | 100 | 2 |
| 10 | d | D | 1.5 | 2.5 | 7.6 | 7.8 | 100 | 2 |
| 11 | d | D | 2.0 | 2.0 | 6.9 | 7.1 | 100 | 2 |
| 12 | d | D | 2.5 | 1.5 | 5.9 | 6.1 | 100 | 3 |
| 13 | d | E | 1.0 | 3.0 | 8.4 | 8.6 | 100 | 2 |
| 14 | e | D | 1.0 | 3.0 | 9.3 | 9.6 | 100 | 1 |
| 15 | e | E | 1.0 | 3.0 | 9.9 | 10.2 | 100 | 1 |
| C-8 | d | — | 4.0 | — | 5.3 | 5.5 | 90 | 3 |
| C-9 | e | — | 4.0 | — | 6.2 | 6.8 | 90 | 2 |
| C-10 | — | D | — | 4.0 | 0.0 | 0.0 | 10 | 12 |
| C-11 | — | E | — | 4.0 | 1.8 | 2.1 | 2 | 10 |
| C-12 | d | — | 1.0 | — | 5.6 | 5.3 | 60 | 6 |
| C-13 | e | — | 1.0 | — | 6.4 | 6.6 | 50 | 5 |
| C-14 | f | D | 1.0 | 3.0 | 7.7 | 6.2 | 90 | 4 |
| C-15 | d | F | 1.0 | 3.0 | 5.8 | 6.0 | 90 | 2 |

It is clear from the results of Sample Nos. 8 to 12 in Table 2 that the thickness of the upper layer is preferably 2.0 μm or less because both VS and C/N are advantageously high.

It is understood from the results of Nos. 13 to 15 that the benefical effects of the present invention did not change when the compositions of the underlayer and the upper layer are changed.

It is apparent from the results of Nos. C-8 to C-11 that one or more of VS, C/N, still life, and head wear is deteriorated, which is unfavorable for a magnetic recording medium for higher density recording, when the upper layer or underlayer is used as a single layer.

The samples Nos. C-12 to C-13 with a thin single layer are not suitable as a magnetic recording medium for higher density recording.

It is clear from the results of Nos. C-14 and C-15 that unfavorable results were obtained when particle length and the crystal sizes of ferromagnetic particles used in the underlayer and the upper layer are outside the ranges of the present invention.

It is understood from the above description that a magnetic recording medium having improved electromagnetic properties, head wear, and durability, and excellent print-through characteristics and light-intercepting property can be obtained in accordance with the present invention.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a non-magnetic support having provided thereon plural magnetic layers containing ferromagnetic particles and binder, wherein the ferromagnetic particles contained in the uppermost magnetic layer have a coercive force of from 600 to 2,500 Oe and an average long axis length measured by transmission electron microscopy of less than 0.25 μm and a crystal size measured by an X-ray diffractiometry of less than 300 Å, said uppermost magnetic layer having a thickness of 1 μm or less, and the ferromagnetic particles contained in the magnetic layers other than said uppermost layer have an average long axis length measured by transmission electron microscopy of 0.25 μm or more and a crystal size measured by X-ray diffractiometory of 250 Å or more, provided that said ferromagnetic particles of said uppermost layer have a crystal size measured by X-ray diffractiometory smaller than that of the ferromagnetic particles of said magnetic layers other than said uppermost layer wherein the ferromagnetic particles contained in the uppermost magnetic layer have an average long axis length of from 0.18 to 0.25 μm and the ferromagnetic particles contained in the magnetic layers other than said uppermost layer have an average long axis length of from 0.25 to 0.40 μm.

2. A magnetic recording medium as claimed in claim 1, wherein the ferromagnetic particles of said uppermost layer have a crystal size measured by X-ray diffractiometory of less than 250 Å, and the ferromagetic particles of said magnetic layers other than said uppermost layer have a crystal size measured by X-ray diffractiometory of 250 Å or more.

3. A magnetic recording medium as claimed in claim 1, wherein said ferromagnetic particles are ferromagnetic iron oxide $FeO_x$ particles or cobalt-containing ferromagnetic iron oxide $Co\text{-}FeO_x$ particles ($1.33 \leq X \leq 1.5$), the crystal size measured by X-ray diffractiometory of the ferromagnetic particles of said uppermost layer is less than 300 Å, and the crystal size measured by X-ray diffractiometory of the ferromagnetic particles of said magnetic layers other than said uppermost layer is 300 Å or more.

4. A magnetic recording medium as claimed in claim 2, wherein the ferromagnetic particles contained in said uppermost magnetic layer are ferromagnetic alloy particles having a crystal size measured by X-ray diffractiometory of less than 200 Å, and the ferromagnetic particles contained in said magnetic layers other than said uppermost layer have a crystal size measured by an X-ray diffractiometory of 250 Å or more.

5. A magnetic recording medium as claimed in claim 4, wherein the ferromagnetic particles contained in said magnetic layers other than said uppermost layer are cobalt-containing ferromagnetic iron oxide $Co\text{-}FeO_x$ particles ($1.33 \leq X \leq 1.5$).

6. A magnetic recording medium as claimed in claim 1, wherein said plural magnetic layers are provided by a wet-on-wet coating method.

7. A magnetic recording medium as claimed in claim 1, wherein the ferromagnetic particles contained in said uppermost magnetic layer have a coercive force of from 800 to 2,000 Oe.

8. A magnetic recording medium as claimed in claim 3, wherein the ferromagnetic particles contained in said magnetic layers other than said uppermost layer have a crystal size measured by X-ray diffractiometory of 350 Å or more.

9. A magnetic recording medium as claimed in claim 3, wherein the ferromagnetic particles contained in said magnetic layers other than said uppermost layer have a coercive force from 0.6 to 1.1 times that of the ferromagnetic particles contained in said uppermost magnetic layer.

10. A magnetic recording medium as claimed in claim 9, wherein the ferromagnetic particles contained in said magnetic layers other than said uppermost layer have a coercive force from 0.8 to 1.0 times that of the ferromagnetic particles contained in said uppermost magnetic layer.

11. A magnetic recording medium as claimed in claim 4, wherein the ferromagnetic particles contained in said magnetic layers other than said uppermost layer have a coercive force from 0.4 to 1.1 times that of the ferromagnetic particles contained in said uppermost magnetic layer.

12. A magnetic recording medium as claimed in claim 11, wherein the ferromagnetic particles contained in said magnetic layers other than said uppermost layer have a coercive force from 0.6 to 1.0 times that of the ferromagnetic particles contained in said uppermost magnetic layer.

13. A magnetic recording medium as claimed in claim 11, wherein said magnetic layers other than said uppermost layer have a thickness of 0.5 μm or more.

14. A magnetic recording medium as claimed in claim 6, wherein said binder used in said uppermost layer is a hardenable binder and said binder used in said magnetic layers other than said uppermost layer is a thermoplastic binder.

* * * * *